United States Patent [19]

Trabocco et al.

[11] 3,847,558

[45] Nov. 12, 1974

[54] TITANIUM-BERYLLIUM REINFORCED MATRICES

[75] Inventors: Ronald E. Trabocco, Blue Bell; John J. DeLuccia, Devon, both of Pa.

[73] Assignee: The United States of America as represented by the Secretary of the Navy, Washington, D.C.

[22] Filed: Aug. 24, 1972

[21] Appl. No.: 283,434

[52] U.S. Cl. .............................. 29/191.4
[51] Int. Cl. ............................... B23p 3/20
[58] Field of Search ............... 29/191.2, 191.4

[56] References Cited
UNITED STATES PATENTS

| | | | |
|---|---|---|---|
| 3,419,952 | 1/1969 | Carlson | 29/191.4 X |
| 3,314,825 | 4/1967 | Forsyth et al. | 29/191.4 UX |
| 3,137,937 | 6/1964 | Cowan et al. | 29/486 |
| 3,434,197 | 3/1969 | Davenport | 29/470.1 |
| 3,609,855 | 10/1971 | Schmidt | 29/191 |

*Primary Examiner*—Winston A. Douglas
*Assistant Examiner*—O. F. Crutchfield
*Attorney, Agent, or Firm*—R. S. Sciascia; Henry Hansen; Arthur A. McGill

[57] ABSTRACT

A composite material having greater strength to density and modulus to density ratios than existing monolithic materials comprises a titanium alloy having either beryllium wires or beryllium wires having a titanium cladding or wrapping for reinforcement. In forming the composite, laminates of titanium alloy sheets are explosively welded to beryllium wire reinforcement or titanium clad or wrapped beryllium wire reinforcement by stacking the laminates in layers with the wires placed between layers and explosively welding the layers and wires together.

4 Claims, 4 Drawing Figures

PATENTED NOV 12 1974

3,847,558

TITANIUM-BERYLLIUM REINFORCED MATRICES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to materials that are a product of an explosive welding process and more particularly to the explosive welding of titanium alloy sheets to beryllium or titanium clad or wrapped beryllium wire to form a composite material.

Practically all fabrication of composite materials today, including those comprising either titanium or beryllium materials, embody the use of diffusion bonding as the primary fabrication procedure. This requires a large expenditure of time and money. This fabrication process entails the use of costly diffusion bonding presses and vacuum systems. The vacuum must be fairly high, e.g. $10^{-4}$ mm., to avoid oxidation of titanium which is a notorious "getter" of oxygen. Beryllium does not lend itself to diffusion bonding either, due to reduction in strength due to the necessary bonding temperature over a period of time. In addition, too long a bonding cycle or too high a temperature can cause formation of undesirable titanium beryllides. Hot rolling fabrication techniques utilizing beryllium can also cause thermal degradation effects, i.e. recrystallization, etc.

SUMMARY OF THE INVENTION

Accordingly, it is a general purpose and object of the present invention to provide an improved material. It is a further object to construct a composite material comprising titanium-beryllium reinforced matrices having greater strength to density and modulus to density ratios than existing monolithic materials. Additionally, it is an object to provide a process to fabricate such material at low production costs with the capability of the bonding of intricate shapes with proper fixturing.

This is accomplished according to the present invention by providing layers of titanium alloy sheets or foils with beryllium wire or titanium clad or wrapped beryllium wire placed between the sheets. The sheets and wire are then subjected to explosion welding forming a composite material.

DESCRIPTION OF THE PREFERRED EMBODIMENTS

Figure 1:
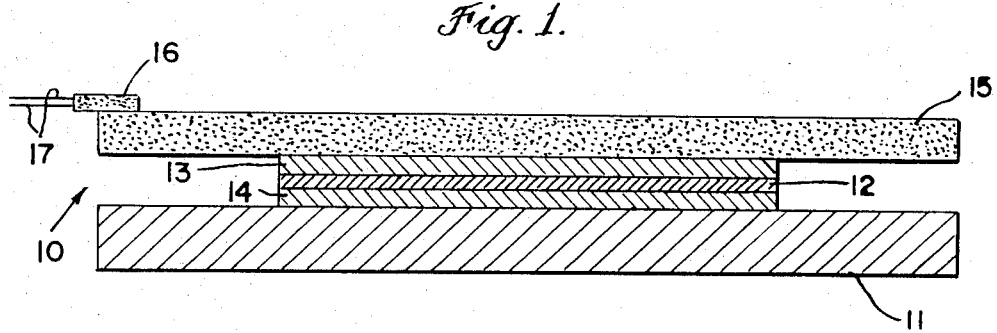
FIG. 1 is a sectional view of an assembly used in forming a composite material according to the present invention.

Referring now to the drawing and particularly to FIG. 1, there is shown an assembly 10 for explosion welding. The assembly 10 comprises a base plate 11 that may be made of high strength steel. A specimen 12 that is to form the composite material and is further explained later is sandwiched between a pair of metal plates 13 and 14 that are comprised of mild steel, thinner than base plate 11. The plate 13 transmits shock loading to materials or specimen 12 and plate 14 functions to absorb shock and insure uniformity of shock loading of specimen 12. An explosive charge 15 comprising peritaerythritol tetranitrates and suitable bonding agent form a low detonation rate explosive. Explosive charge 15 rests on metal plate 13. The charge 15 has an electric detonator 16 with wires 17 attached.

Figure 2:
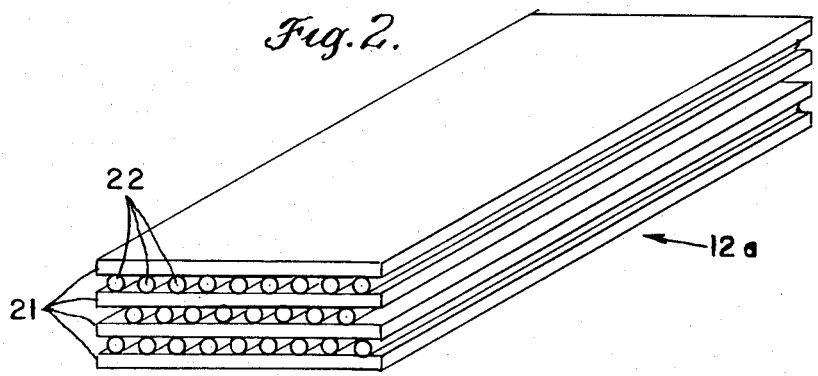
FIG. 2 is a view of a first embodiment of the components used to form the composite material in the assembly of FIG. 1.

FIG. 2 shows a first embodiment 12a of the specimen 12 of FIG. 1, comprising four sheets 21 of titanium alloy foil 6-4 having by weight 6% Al, 4% V and 90% Ti or β-3 having 12% Mo, 5% Sn, 7% Zr and 76% Ti. The four sheets 21 of titanium alloy are shown for illustration purposes. The actual number can be between two and 10 sheets with each sheet 21 having a thickness of from 2 to 10 mils. Inserted between the sheets 21 are a plurality of beryllium wires or rods 22 having a diameter of approximately 4-6 mils and a spacing between the outer surface of wires 22 of from 2 to 5 mils.

Figure 3:
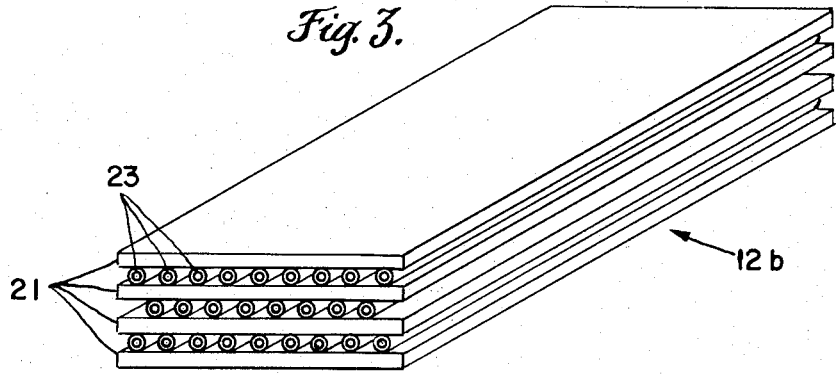
FIG. 3 is a view of a second embodiment of elements used to form the composite material in the assembly of FIG. 1.

FIG. 3 shows a second embodiment 12b of the specimen 12 of FIG. 1, comprising sheets 21 with a commercially pure titanium clad beryllium wire 23 inserted between sheets 21. Wire 23 has a diameter of 7-9 mils with a central beryllium core of 4-6 mils. The spacing between the outer surfaces of wire 23 is from 5 to 8 mils.

Figure 4:
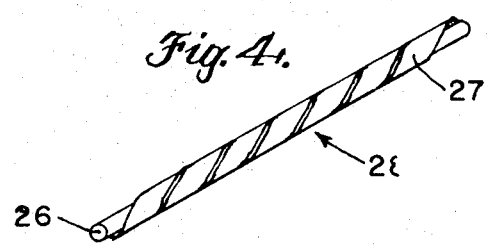
FIG. 4 is a substitute reinforcement for use in the embodiment of FIG. 3.

FIG. 4 shows a variation of the titanium beryllium wire of FIG. 3 with a reinforcement 28 having a central core of beryllium wire 26 with a 4-6 mils diameter and a commercially pure titanium foil 27 having a thickness of 1.5-2.5 mils and being 9-11 mils wide wrapped around wire 26. The reinforcement 28 can be used in place of wire 23 in FIG. 3 with a spacing of 1-5 mils between the outer surfaces of foil 27.

In operation, a battery or other power source (not shown) can be connected to wires 17 by means of a switch (not shown). On applying a voltage to the leads 17 of detonator 16 in FIG. 1, charge 15 is detonated causing an explosion welding of specimen 12 with the materials flowing to fill in spaces in the original assembly. The composite material may be formed using the titanium alloy sheets 21 and beryllium wire 22 as shown in FIG. 2. Alternatively, the composite material may comprise the titanium alloy sheets 21 with the titanium clad beryllium wire 23 as shown in FIG. 3. An alternate choice for FIG. 3 would be to replace wire 23 with the beryllium wire 26 wrapped with titanium foil 27 as shown in FIG. 4.

It has therefore been shown that an economic method of producing a composite material of beryllium and titanium alloy may be obtained by means of explosion welding. The process avoids the problems normally encountered in using these materials. In addition, when the composite material is obtained as in the foregoing description, it has high strength to density and modulus to density ratio, making the material useful for aircraft construction.

It will be understood that various changes in the details, materials, steps and arrangements of parts, which have been herein described and illustrated in order to explain the nature of the invention, may be made by

What is claimed is:

1. A composite material comprising:
   a plurality of titanium alloy sheets; and
   a plurality of beryllium wires located between all adjacent said sheets and explosively welded to said titanium alloy sheets forming a titanium matrix reinforced with beryllium wherein said beryllium wires have a helical titanium wrapping.

2. A composite according to claim 1 wherein said wires are substantially parallel to each other and spaced from one to 5 mils from each other.

3. A composite according to claim 2 wherein said helical titanium wrapping has a thickness from 1.5 to 2.5 mils and a width from 9 to 11 mils.

4. A method of forming a composite material comprising the steps of:

assembling a specimen comprising at least two sheets of titanium alloy and at least one intervening layer comprising a plurality of substantially parallel beryllium wires wherein said beryllium wires have a helical titanium wrapping;

placing the specimen between a first and second metal plate with said first plate on top of said specimen and said second plate underneath said specimen;

placing said specimen and said first and second metal plates on top of a base plate;

juxtaposing an explosive on top of said first metal plate; and detonating said explosive so as to weld the specimen together with the materials of the specimen flowing to fill in the spaces formed in the specimen as assembled.

* * * * *